United States Patent [19]
Adachi et al.

[11] Patent Number: 6,060,154
[45] Date of Patent: *May 9, 2000

[54] COATING LIQUID FOR SELECTIVE PERMEABLE MEMBRANE, SELECTIVE PERMEABLE MEMBRANE AND SELECTIVE PERMEABLE MULTILAYERED MEMBRANE

[75] Inventors: Kenji Adachi, Inzai; Hiromitsu Takeda, Ichikawa; Hiroko Kuno, Matsudo, all of Japan

[73] Assignee: Sumitomo Metal Mining Co., Ltd., Tokyo, Japan

[*] Notice: This patent is subject to a terminal disclaimer.

[21] Appl. No.: 08/951,166

[22] Filed: Oct. 15, 1997

[30] Foreign Application Priority Data

Sep. 30, 1997 [JP] Japan ..................................... 9-264756
Oct. 15, 1997 [JP] Japan ..................................... 9-297781

[51] Int. Cl.⁷ ................................. B32B 5/16; B32B 9/00
[52] U.S. Cl. .......................... 428/323; 428/689; 428/697; 428/698; 428/699; 428/328
[58] Field of Search ..................................... 428/323, 328, 428/329, 331, 426, 432, 688, 697, 698, 699, 689; 524/403, 430; 106/18.32, 286.1, 287.1, 287.14

[56] References Cited

U.S. PATENT DOCUMENTS

| | | | |
|---|---|---|---|
| 5,464,566 | 11/1995 | Ito et al. | 252/582 |
| 5,520,855 | 5/1996 | Ito et al. | 252/582 |
| 5,618,626 | 4/1997 | Nagashima et al. | 428/429 |
| 5,654,090 | 8/1997 | Kayanoki | 428/329 |
| 5,691,044 | 11/1997 | Oyama et al. | 428/216 |
| 5,723,535 | 3/1998 | Krismer et al. | 524/591 |
| 5,840,364 | 11/1998 | Takeda et al. | 427/160 |

FOREIGN PATENT DOCUMENTS

| | | |
|---|---|---|
| 06145561A | 5/1994 | Japan . |
| 6114874 | 5/1994 | Japan . |
| 8143335 | 6/1996 | Japan . |

*Primary Examiner*—Paul Thibodeau
*Assistant Examiner*—Sheeba Ahmed
*Attorney, Agent, or Firm*—Watson Cole Grindle Watson, P.L.L.C.

[57] ABSTRACT

A coating solution for forming a selectively transmitting film which is effective for cutting off ultraviolet radiation in a wide range of wavelengths up to about 400 nm, maintains its stability and effect for a long time, has also a power of cutting off heat rays and a controlled transmittance of visible light, has any desired color produced by the addition of fine particles of an appropriate inorganic substance, and is applicable to glass in any existing building, or the like by a simple and inexpensive method using an appropriately selected binder, and a selectively transmitting film and a selectively transmitting multilayer film which are formed from the solution. The solution is a dispersion of fine particles having an average diameter of 100 nm or less of at least one of ruthenium oxide, titanium nitride, tantalum nitride, titanium silicide, molybdenum silicide, lanthanum boride, iron oxide and iron hydroxide oxide. It may also contain at least one of the alkoxides of silicon, zirconium, titanium and aluminum, and partially hydrolyzed polymers of those alkoxides, or a synthetic resin as a binder. The selectively transmitting film is formed by coating a base material with the solution, and hardening it. The selectively transmitting multilayer film has another film formed on the selectively transmitting film and containing at least one of the alkoxides of silicon, zirconium, titanium and aluminum, partially hydrolyzed polymers of those alkoxides, and a synthetic resin.

4 Claims, No Drawings

COATING LIQUID FOR SELECTIVE PERMEABLE MEMBRANE, SELECTIVE PERMEABLE MEMBRANE AND SELECTIVE PERMEABLE MULTILAYERED MEMBRANE

BACKGROUND OF THE INVENTION

1. Field of the Invention

This invention relates to a coating solution for forming a selectively transmitting film on a transparent base, such as glass or plastics. More particularly, it relates to a selectively transmitting film, or multilayer film for transmitting, reflecting or absorbing ultraviolet radiation, heat rays, visible light or infrared radiation selectively depending on the purpose for which it is used, and a coating solution for forming the same.

2. Description of the Prior Art

Ultraviolet radiation is feared, since it has been showing a sharp increase in its amount reaching the Earth as a result of the formation, or enlargement of holes in the ozone layer, and has an adverse effect on the human body by, for example, causing sunburn, or a cancer of the skin. It passes through windows into houses, buildings, automobiles, shops, etc., and causes the fading, discoloration, or deterioration of curtains, carpets, sofas, or other pieces of furniture, pictures, papers, etc.

Oxides of titanium, cerium or zinc have, for example, been known as an agent for cutting off ultraviolet radiation, but as they have a low absorbance of ultraviolet radiation having long wavelengths in the vicinity of 400 nm, none of these compounds has been satisfactory as a material for cutting off wavelengths in the vicinity of 400 nm if they are used alone.

Another known agent for cutting off ultraviolet radiation comprises an organic compound such as benzophenone. It has a high absorbance of ultraviolet radiation, but it has been difficult to expect from it a steady power of cutting off ultraviolet radiation for a long time, since it is decomposed by absorbing ultraviolet radiation.

Attention has recently come to be drawn to glass for cutting off heat rays for saving the consumption of energy by cutting off the entry of the heat energy of sunlight through windows and thereby reducing the load of air conditioners during summer, and glass having a regulated transmittance of visible light for the protection of privacy. These sheets of glass have, however, had a demand differing widely in the place of use, color, transmittance of light, and the power of cutting off heat rays, and as the functional films formed on those sheets of glass for imparting the necessary functions to them have mostly been formed by a dry process such as sputtering, or vapor deposition, it has been difficult to manufacture many kinds of different products each in a small quantity to satisfy any and all demands, and the necessity for large equipment and complicated operation has meant a very high cost of manufacture. Moreover, there have been available few products having a power of cutting off ultraviolet radiation having wavelengths particularly in the vicinity of 400 nm, nor has there been substantially any glass adapted to control the transmission of all of ultraviolet radiation, heat rays (solar energy) and visible light.

A film colored with an organic dye has also been commercially available, but no such film has been very effective, as the dye is seriously damaged by ultraviolet radiation, etc.

The dry process used for forming the functional films as stated above requires large and complicated vacuum equipment, etc., and has been inapplicable to any work that has to be done on any glass in, say, the windows of existing houses, buildings, automobiles, etc.

SUMMARY OF THE INVENTION

Under these circumstances, it is an object of this invention to provide a coating solution for forming a selectively transmitting film which is effective for cutting off ultraviolet radiation in a wide range of wavelengths up to about 400 nm, maintains its stability and effect for a long time, as opposed to the known organic agent, or dye for cutting off ultraviolet radiation, has also a power of cutting off heat rays and a controlled transmittance of visible light, has any desired color produced by the addition of fine particles of an appropriate inorganic substance, and is applicable to glass in any existing building, or the like by a simple and inexpensive method using an appropriately selected binder, and also to provide a selectively transmitting film and a selectively transmitting multilayer film which are formed from the solution.

We, the inventors of this invention, have made this invention by finding that the problems of the prior art as pointed out above can be overcome by dispersing fine particles of an inorganic substance of high weatherability having a specific average diameter.

According to a first aspect of this invention, there is provided a coating solution for forming a selectively transmitting film which comprises a dispersion of fine particles having an average diameter of 100 nm or less of at least one substance selected from ruthenium oxide, titanium nitride, tantalum nitride, titanium silicide, molybdenum silicide, lanthanum boride, iron oxide and iron hydroxide oxide, which may also contain at least one substance selected from the alkoxides of silicon, zirconium, titanium and aluminum, and partially hydrolyzed polymers of those alkoxides, and which may further contain a synthetic resin as a binder.

According to a second aspect of this invention, there is provided a selectively transmitting film formed by coating a base material with a coating solution as defined above, and hardening it.

According to a third aspect of this invention, there is provided a selectively transmitting multilayer film having another film formed on the selectively transmitting film as defined above, and containing at least one substance selected from the alkoxides of silicon, zirconium, titanium and aluminum, partially hydrolyzed polymers of those alkoxides, and a synthetic resin.

DETAILED DESCRIPTION OF THE INVENTION

We have made a careful study of finely divided inorganic materials absorbing ultraviolet radiation having long wavelengths in the vicinity of 400 nm effectively, and have first found iron oxide and hydroxide. We have found that a film formed by coating a base material with a solution prepared by dispersing fine particles of iron oxide or hydroxide oxide having an average diameter of 100 nm or less transmits light in the visible range and absorbs light in the ultraviolet range.

We have also studied fine particles of ruthenium oxide, titanium nitride, tantalum nitride, titanium silicide, molybdenum silicide and lanthanum boride, and found that they are all a powder absorbing light in the visible range, but that a film formed by dispersing any such fine particles having an average diameter of 100 nm or less transmits light in the visible range, and cuts off light in the near infrared range.

As regards the color of a film formed by dispersing any such fine particles having an average diameter of 100 nm or less, a film of iron oxide has a red color, a film of iron hydroxide oxide a yellow color, a film of ruthenium oxide a green color, a film of any of titanium nitride, tantalum nitride, titanium silicide and molybdenum silicide a blue color, and a film of lanthanum boride a purplish red color.

The following are examples of other inorganic materials that are comparable in properties to those listed above.

It is possible to use fine particles of $Pb_2Ru_2O_{6.5}$ or $Bi_2Ru_2O_{7-x}$ instead of fine particles of ruthenium oxide; fine particles of zirconium or hafnium nitride instead of fine particles of titanium or tantalum nitride, or titanium or molybdenum silicide; fine particles of titanium boride instead of lanthanum boride; and fine particles of iron nitrogen oxide or iron nitride instead of iron hydroxide oxide.

The fine particles of an inorganic substance in the coating solution of this invention are required to have an average diameter of 100 nm or less. If their average diameter is larger than 100 nm, the flocculation of particles in their dispersion is likely to cause the settlement of the coagulated particles in the coating solution. Particles having an average diameter exceeding 100 nm, and coarser particles formed by their cogulation are also undesirable, since their scattering of light is likely to bring about an increase in haze of a film and a decrease of its visible light transmittance. While the fine particles are required to have an average diameter of 100 nm or less for the reasons as stated above, its lower limit is about 2 nm, since this is the smallest average particle diameter that is economically available in accordance with the present state of art.

The medium to be used for dispersing the fine particles in the coating solution is not particularly limited, but depends on the coating conditions, or environment, the alkoxide and synthetic resin binder employed in the coating solution, etc., and may, for example, be water, or an organic solvent such as alcohol, while an acid, or alkali can be added to adjust the pH of the solution, if required. It is also possible to add any of coupling agents, surface active agents, etc. to improve the dispersion stability of the fine particles in the ink to a further extent. The amount of each additive is 30% by weight or less, preferably 5% by weight, relative to the fine particles. Any method can be employed for dispersing the fine particles if it can disperse them uniformly in the solution, and examples are a method using a ball-mill, or sand mill, and ultrasonic dispersion.

The selectively transmitting film of this invention is a film formed by the highly dense deposition of the fine particles on a base material. The alkoxide of silicon, zirconium, titanium or aluminum, or the partially hydrolyzed polymer of any such alkoxide, or the synthetic resin binder in the coating solution improves the bonding of the fine particles to the base material upon hardening of the film, and also improves the hardness of the film. The bonding force of the film consisting mainly of the fine particles to the base material and its hardness and weatherability can be improved to a further extent by forming thereon as a second layer a film containing a metal alkoxide, as of silicon, zirconium, titanium or aluminum, or a partially hydrolyzed polymer of any such alkoxide, or a synthetic resin.

If the coating solution does not contain any alkoxide of silicon, zirconium, titanium or aluminum, or any partially hydrolyzed polymer thereof, or any synthetic resin, there is obtained a film composed solely of the fine particles deposited on the base material. Although it transmits light selectively, a multilayer film formed by forming thereon a film by applying a coating solution containing the alkoxide of silicon, zirconium, titanium or aluminum, or a partially hydrolyzed polymer of any such alkoxide, or a synthetic resin has a lower degree of haze, an improved transmittance of light in the visible range and an improved bonding of the fine particles to the base material, since the coating solution fills the interstices between the fine particles in the first layer.

Although sputtering or vapor deposition can be employed for forming a film of any metal alkoxide, as of silicon, zirconium, titanium or aluminum, or any partially hydrolyzed polymer thereof covering the film consisting mainly of the fine particles, wet-type coating using coating solutions is a more effective method owing to its advantages including its ease and low cost in forming a film. A coating solution for forming such a film contains one or more of alkoxides as of silicon, zirconium, titanium and aluminum, and partially hydrolyzed polymers thereof in water or alcohol, preferably in the amount of 40% by weight or less based on oxides formed upon heating. An acid, or alkali can be added to the solution to adjust its pH, if required. The solution is coated on the film consisting mainly of the fine particles, and heated to form a second layer, whereby a film of oxide, as of silicon, zirconium, titanium or aluminum, can be formed easily.

Any method, such as spin, spray or dip coating, screen printing, or flow coating, may be employed without any particular limitation for applying the coating solution for forming the first or second layer if it can form a smooth, thin and uniform film.

After it has been coated with the solution containing any such metal alkoxide, or partially hydrolyzed polymer thereof, the base material is heated at a temperature preferably not lower than 100° C., and more preferably not lower than the boiling point of the solvent in the solution. If its heating temperature is lower than 100° C., the polymerization reaction of the alkoxide, or partially hydrolyzed polymer thereof in the film often remains yet to be completed, and water or an organic solvent remains in the film until after heating, and lowers its transmittance of visible light.

If the solution contains a synthetic resin binder, it is cured by a method which is appropriate for the resin. If it is, for example, an ultraviolet-curing resin, the film is exposed to an appropriate amount of ultraviolet radiation, and if it is a cold-curing resin, the film is left to stand. Therefore, the solution is applicable to, for example, any existing window pane at the site of a building, and has a widened scope of use.

The coating solution of this invention is a dispersion of the fine particles, and can be used to form a thin transmitting film having a uniform thickness and stable properties, since it does not rely upon the decomposition of its constituents by the heat of baking, or their chemical reaction for forming a film for cutting off sunlight.

The film formed from the dispersion of fine particles according to this invention is a film formed by the highly dense deposition of the fine particles on a base material. The alkoxide of silicon, zirconium, titanium or aluminum, or the partially hydrolyzed polymer of any such alkoxide, or the synthetic resin binder in the coating solution improves the bonding of the fine particles to the base material upon hardening of the film, and also improves the hardness of the film.

This invention makes it possible to produce an ink having an appropriate transmittance of ultraviolet radiation, visible light, or infrared radiation and an appropriate color which are suitable for its intended use, if the fine particles are prepared from an appropriate mixture of materials. As the fine particles are of an inorganic material, they have a very high level of weatherability as compared with those of any organic material, and hardly undergo any change or lowering in color, or other properties even if they may be used in any place exposed to sunlight (ultraviolet radiation).

This invention also makes it possible to form a wide variety of selectively transmitting films each in a small quantity. It can readily satisfy a wide variety of demands by, for example, preparing a plurality of solutions having different compositions for coating window panes in one and the same building, such as one having a high power of cutting off sunlight and thereby reducing any influence of its heat for a window exposed to the afternoon sun, one having a low transmittance of visible light and thereby enabling the protection of privacy for a window of the ground floor exposed to the eyes of other people, one having a high power of cutting off ultraviolet radiation for a window through which intense sunlight comes in to cause the fading in color of furniture, curtains, etc., and the sunburn of the human body, and one producing a color matching a particular room. As it is in almost all of the cases after the start of use of, say, a house that any such demand arises, it is of great advantage that it is possible to prepare a coating solution at the site of its application by using a cold-curing binder and considering the situation which has made its application to, say, a window pane necessary or desirable.

EXAMPLES

The invention will now be described by way of examples embodying it and comparative examples.

Example 1

A dispersion of iron oxide ($Fe_2O_3$) in the amount of 100 g was prepared by mixing 20 g of fine particles of iron oxide ($Fe_2O_3$) having an average diameter of 30 nm, 69.5 g of ethyl alcohol, 10 g of diacetone alcohol (DAA) and 0.5 g of a titanate type coupling agent (PRENACT KR-44, product of Ajinomoto Corp.) in a ball-mill with zirconia balls having a diameter of 4 mm for 80 hours (solution A).

A mixed ethyl silicate solution in the amount of 100 g was prepared by mixing 30 g of ethanol uniformly with 70 g of an ethyl silicate solution obtained by mixing 25 g of ethyl silicate 40 (product of Tama Chemical Industrial Co., Ltd.) with 32 g of ethanol, 8 g of a 5% aqueous solution of hydrochloric acid and 5 g of water (solution B).

Solutions A and B were thoroughly mixed by dilution with ethanol so as to form a solution having the composition shown at Example 1 in Table 1. 15 g of the solution was dropped from a beaker onto a base formed by a sheet of soda-lime glass measuring 200 mm square by 3 mm and rotating at 200 rpm, and it was kept rotating for five minutes until its rotation was stopped. Then, the glass sheet was heated for 30 minutes in an electric oven having a temperature of 180° C., whereby a film was formed thereon as intended.

The film as formed was examined for its transmittance of wavelengths of 200 to 1800 nm by a spectrophotometer made by Hitachi, Limited, and its transmittances of solar energy ($\tau e$) and visible light ($\tau v$) were calculated in accordance with JIS R 3106, and its transmittance of ultraviolet radiation ($\tau uv$) in accordance with ISO 9050. Its 400-nm transmittance (400 nmT %) was also read. The results are shown in Table 2. Table 2 also shows the optical characteristics of films as formed in Examples 2 to 12 and Comparative Examples 1 and 2 which will hereinafter be described.

Example 2

Solution A was diluted with ethanol to form a solution having an iron oxide ($Fe_2O_3$) concentration of 3.0%, and 15 g of the solution was dropped from a beaker onto a base formed by a sheet of soda-lime glass measuring 200 mm square by 3 mm and rotating at 200 rpm, and it was kept rotating for five minutes until its rotation was stopped. Solution B was also diluted with ethanol to form a solution having a $SiO_2$ concentration of 3.0%, and 15 g of the solution was dropped from a beaker onto the base coated as described, and rotating at 200 rpm, and it was kept rotating for five minutes until its rotation was stopped. Then, the glass sheet was heated for 30 minutes in an electric oven having a temperature of 180° C., whereby a film was formed thereon as intended. The optical characteristics of the film are shown in Table 2.

Example 3

A dispersion of iron hydroxide oxide (FeOOH) in the amount of 100 g was prepared by mixing 20 g of fine particles of iron hydroxide oxide(FeOOH)having an average diameter of 30 nm, 69.5 g of ethyl alcohol, 10 g of diacetone alcohol (DAA) and 0.5 g of a titanate type coupling agent (PRENACT KR-44, product of Ajinomoto Corp.) in a ball mill with zirconia balls having a diameter of 4 mm for 80 hours (solution C). A cold-curing silicone resin was diluted with ethanol to form a solution having a solid content of 20% (solution D).

Solutions C and D were diluted with ethanol to form a solution having the composition shown at Example 3 in Table 1, and Example 1 was thereafter repeated for forming a film as intended and determining its optical characteristics. The optical characteristics of the film are shown in Table 2.

Example 4

Solutions A, C and D were diluted with ethanol to form a solution having the composition shown at Example 4 in Table 1, and Example 1 was thereafter repeated for forming a film as intended. The optical characteristics of the film are shown in Table 2.

Example 5

A dispersion of ruthenium oxide ($RuO_2$) in the amount of 100 g was prepared by mixing 20 g of fine particles of ruthenium oxide ($RuO_2$) having an average diameter of 40 nm, 69.5 g of ethyl alcohol, 10 g of N-methyl-2-pyrrolidone and 0.5 g of a titanate type coupling agent (PRENACT KR-44, product of Ajinomoto Corp.) in a ball mill with zirconia balls having a diameter of 4 mm for 100 hours (solution E).

Solutions A, B and E were diluted with ethanol to form a solution having the composition shown at Example 5 in Table 1, and Example 1 was thereafter repeated for forming a film as intended. The optical characteristics of the film are shown in Table 2.

Example 6

Solutions C, B and E were diluted with ethanol to form a solution having the composition shown at Example 6 in Table 1, and Example 1 was thereafter repeated for forming a film as intended. The optical characteristics of the film are shown in Table 2.

Example 7

Solutions C, B and E were diluted with ethanol to form a solution having the composition shown at Example 7 in Table 1, and Example 1 was thereafter repeated for forming a film as intended. The optical characteristics of the film are shown in Table 2.

Example 8

Solutions C, B and E were diluted with ethanol to form a solution having the composition shown at Example 8 in Table 1, and Example 1 was thereafter repeated for forming a film as intended. The optical characteristics of the film are shown in Table 2.

Example 9

A dispersion of titanium nitride (TiN) in the amount of 100 g was prepared by mixing 20 g of fine particles of titanium nitride(TiN) having an average diameter of 30 nm, 69.5 g of diacetone alcohol, 10 g of N-methyl-2-pyrrolidone and 0.5 g of a silane coupling agent in a ball mill with zirconia balls having a diameter of 4 mm for 100 hours (solution F).

Solutions B, C and F were diluted with ethanol to form a solution having the composition shown at Example 9 in Table 1, and Example 1 was thereafter repeated for forming a film as intended. The optical characteristics of the film are shown in Table 2.

Example 10

Solutions B and F were diluted with ethanol to form a solution having the composition shown at Example 10 in Table 1, and Example 1 was thereafter repeated for forming a film as intended. The optical characteristics of the film are shown in Table 2.

Example 11

A dispersion of lanthanum boride(LaB$_6$) in the amount of 100 g was prepared by mixing 20 g of fine particles of lanthanum boride (LaB$_6$) having an average diameter of 40 nm, 69.5 g of diacetone alcohol, 10 g of N-methyl-2-pyrrolidone and 0.5 g of a silane coupling agent in a ball mill with zirconia balls having a diameter of 4 mm for 100 hours (solution G).

Solutions A, B and G were diluted with ethanol to form a solution having the composition shown at Example 11 in Table 1, and Example 1 was thereafter repeated for forming a film as intended. The optical characteristics of the film are shown in Table 2.

Example 12

Solutions B and E were diluted with ethanol to form a solution having the composition shown at Example 12 in Table 1, and Example 1 was thereafter repeated for forming a film as intended. The optical characteristics of the film are shown in Table 2.

Comparative Example 1

A dispersion of titanium oxide(TiO$_2$) in the amount of 100 g was prepared by mixing 30 g of fine particles of titanium oxide (TiO$_2$) having an average diameter of 50 nm, 59.5 g of ethyl alcohol, 10 g of diacetone alcohol (DAA) and 0.5 g of a titanate type coupling agent (PRENACT KR-44, product of Ajinomoto Corp.) in a ball mill with zirconia balls having a diameter of 4 mm for 100 hours (solution H).

Solutions B and H were thoroughly mixed by dilution with ethanol so as to form a solution having the composition shown at Comparative Example 1 in Table 1. 15 g of the solution was dropped from a beaker onto a base formed by a sheet of soda-lime glass measuring 200 mm square by 3 mm and rotating at 100 rpm, and it was kept rotating for two minutes until its rotation was stopped. Then, the glass sheet was heated for 15 minutes in an electric oven having a temperature of 180° C., whereby a film was formed thereon as intended. The optical characteristics of the film are shown in Table 2.

Comparative Example 2

A dispersion of zinc oxide(ZnO) in the amount of 100 g was prepared by mixing 30 g of fine particles of zinc oxide (ZnO) having an average diameter of 45 nm, 59.5 g of ethyl alcohol, 10 g of diacetone alcohol (DAA) and 0.5 g of a titanate type coupling agent (PRENACT KR-44, product of Ajinomoto Corp.) in a ball mill with zirconia balls having a diameter of 4 mm for 100 hours (solution I).

Solutions B and I were diluted with ethanol so as to form a solution having the composition shown at Comparative Example 2 in Table 1, and Comparative Example 1 was thereafter repeated for forming a film as intended. The optical characteristics of the film are shown in Table 2.

TABLE 1

| | Solid contents of coating ink (% by weight) | | | | | | | |
|---|---|---|---|---|---|---|---|---|
| | Iron oxide | Iron hydroxide | Ruthenium oxide | Titanium nitride | Lanthanum boride | Titanium oxide | Zinc oxide | Binder |
| Example 1 | 5.0 | 0.0 | 0.0 | 0.0 | 0.0 | — | — | 5.0 |
| Example 2 | 3.0 | 0.0 | 0.0 | 0.0 | 0.0 | — | — | 0.0 |
| Example 3 | 0.0 | 6.0 | 0.0 | 0.0 | 0.0 | — | — | 7.0 |
| Example 4 | 1.5 | 5.0 | 0.0 | 0.0 | 0.0 | — | — | 3.5 |
| Example 5 | 3.2 | 0.0 | 2.1 | 0.0 | 0.0 | — | — | 5.0 |
| Example 6 | 0.0 | 7.0 | 2.0 | 0.0 | 0.0 | — | — | 6.0 |
| Example 7 | 0.0 | 6.0 | 1.0 | 0.0 | 0.0 | — | — | 3.5 |
| Example 8 | 0.0 | 6.0 | 0.5 | 0.0 | 0.0 | — | — | 3.5 |
| Example 9 | 0.0 | 0.0 | 0.0 | 1.0 | 0.0 | — | — | 3.0 |
| Example 10 | 0.0 | 0.0 | 0.0 | 0.8 | 0.0 | — | — | 3.5 |
| Example 11 | 2.0 | 0.0 | 0.0 | 0.0 | 1.1 | — | — | 3.5 |
| Example 12 | 0.0 | 0.0 | 1.0 | 0.0 | 0.0 | — | — | 1.0 |
| Comparative Example 1 | — | — | — | — | — | 12.0 | 0.0 | 2.0 |
| Comparative Example 2 | — | — | — | — | — | 0.0 | 10.0 | 3.0 |

TABLE 2

| | Optical characteristics (%) | | | | |
|---|---|---|---|---|---|
| | τuv | 400 nm T % | τv | τe | Color transmitted |
| Example 1 | 1.57 | 1.69 | 59.29 | 76.47 | Red |
| Example2 | 5.33 | 6.63 | 66.81 | 79.10 | Red |
| Example 3 | 3.26 | 4.83 | 81.30 | 90.6 | Yellow |
| Example 4 | 0.42 | 2.72 | 72.08 | 80.55 | Brown |
| Example 5 | 0.75 | 1.28 | 29.63 | 27.72 | Reddish green |
| Example 6 | 0.37 | 2.50 | 26.99 | 24.57 | Yellowish green |
| Example 7 | 0.86 | 7.23 | 54.60 | 45.57 | Yellowish green |
| Example 8 | 1.74 | 13.56 | 73.87 | 66.28 | Yellowish green |
| Example 9 | 0.98 | 8.12 | 53.20 | 44.57 | Green |
| Example 10 | 28.6 | 43.52 | 60.23 | 49.41 | Blue |
| Example 11 | 6.25 | 7.23 | 53.76 | 47.36 | Purplish red |

TABLE 2-continued

| | Optical characteristics (%) | | | | |
|---|---|---|---|---|---|
| | τuv | 400 nm T % | τv | τe | Color transmitted |
| Example 12 | 21.8 | 35.2 | 53.3 | 40.2 | Green |
| Comparative Example 1 | 19.36 | 80.23 | 88.22 | — | None |
| Comparative Example 2 | 14.51 | 82.39 | 89.15 | — | None |

It is obvious from Table 2 that the films according to the Examples of this invention showed very good results in all of their optical characteristics, i.e. their transmittances of solar energy (τe), visible light (τv) and ultraviolet radiation (τuv), and 400-nm transmittance (400 nm T %), while also presenting the desired colors, as opposed to the products of the Comparative Examples.

As is obvious from the foregoing, this invention can provide a coating solution for forming a selectively transmitting film which is effective for cutting off ultraviolet radiation in a wide range of wavelengths up to about 400 nm, maintains its stability and effect for a long time, as opposed to the known organic agent, or dye for cutting off ultraviolet radiation, has also a power of cutting off heat rays and a controlled transmittance of visible light, has any desired color produced by the addition of fine particles of an appropriate inorganic substance, and is applicable to glass in any existing building, or the like by a simple and inexpensive method using an appropriately selected binder, and also provide a selectively transmitting film and a selectively transmitting multilayer film which are formed from the solution.

What is claimed is:

1. A multilayer film for controlled passage of radiation therethrough, comprising:

an underlying film formed by coating a base with a coating solution comprising a dispersion of fine particles having an average diameter of 100 nm or less of at least one substance selected from the group consisting of ruthenium oxide, titanium nitride, tantalum nitride, titanium silicide, molybdeum silicide, lanthanum boride, and iron hydroxide oxide, and hardening said coating solution, and an overlying film containing at least one substance selected from the group consisting of alkoxides of silicon, zirconium, titanium and aluminum, partially hydrolyzed polymers of said alkoxides, and a synthetic resin.

2. A multilayer film as set forth in claim 1, wherein said base is coated with said coating solution by spin, spray or dip coating, screen printing, or flow coating.

3. A multilayer film as set forth in claim 1, wherein said base is heated to at least 100° C. when coated with said coating solution.

4. A selectively transmitting multilayer film as set forth in claim 1, wherein said overlying film is formed by a coating solution containing at least one of said alkoxides, and partially hydrolyzed polymers in a dispersant in the amount of 40% by weight or less based on oxides formed upon heating.

* * * * *